(12) United States Patent
Greenblatt (10) Patent No.: US 7,359,960 B1
(45) Date of Patent: Apr. 15, 2008

(54) TELECOMMUNICATIONS CONTROL SYSTEM USING DATA INTERCHANGE

(75) Inventor: David Greenblatt, New York, NY (US)

(73) Assignee: Net2Phone, Inc., Newark, NJ (US)

( * ) Notice: Subject to any disclaimer, the term of this patent is extended or adjusted under 35 U.S.C. 154(b) by 1609 days.

(21) Appl. No.: 09/575,707

(22) Filed: Jul. 20, 2000

Related U.S. Application Data

(60) Provisional application No. 60/144,869, filed on Jul. 20, 1999.

(51) Int. Cl.
G06F 15/16 (2006.01)
G06F 15/173 (2006.01)

(52) U.S. Cl. .............. 709/223; 709/224; 709/226; 709/245; 709/246

(58) Field of Classification Search ........ 709/204–207, 709/249–250, 217–219, 231, 223, 224, 226, 709/245, 246, 238; 370/352, 260, 356; 713/202; 379/211.02, 40.01; 700/236
See application file for complete search history.

(56) References Cited

U.S. PATENT DOCUMENTS

| | | | | |
|---|---|---|---|---|
| 5,835,718 A * | 11/1998 | Blewett | ........................ | 709/218 |
| 5,991,394 A | 11/1999 | Dezonno et al. | | |
| 6,011,794 A | 1/2000 | Mordowitz et al. | | |
| 6,047,060 A * | 4/2000 | Fedorov et al. | ........ | 379/265.02 |
| 6,052,367 A | 4/2000 | Bowater et al. | | |
| 6,065,016 A | 5/2000 | Stuntebeck et al. | | |
| 6,072,780 A * | 6/2000 | Johnson, Jr. et al. | ....... | 370/260 |
| 6,075,783 A | 6/2000 | Voit | | |
| 6,104,711 A | 8/2000 | Voit | | |
| 6,130,933 A * | 10/2000 | Miloslavsky | ............. | 379/90.01 |
| 6,163,536 A * | 12/2000 | Dunn et al. | .................. | 370/352 |
| 6,212,184 B1 * | 4/2001 | Venkatachary et al. | ..... | 370/392 |
| 6,223,292 B1 * | 4/2001 | Dean et al. | .................. | 713/202 |
| 6,275,490 B1 * | 8/2001 | Mattaway et al. | ........... | 370/352 |
| 6,308,219 B1 * | 10/2001 | Hughes | ...................... | 709/238 |
| 6,317,650 B1 * | 11/2001 | Powell et al. | ............... | 700/236 |
| 6,347,085 B2 * | 2/2002 | Kelly | ......................... | 370/352 |
| 6,366,575 B1 * | 4/2002 | Barkan et al. | .............. | 370/352 |
| 6,411,615 B1 * | 6/2002 | DeGolia et al. | ............ | 370/352 |
| 6,430,282 B1 * | 8/2002 | Bannister et al. | ....... | 379/211.02 |
| 6,505,201 B1 * | 1/2003 | Haitsuka et al. | .............. | 707/10 |
| 6,507,577 B1 * | 1/2003 | Mauger et al. | ............. | 370/356 |

* cited by examiner

Primary Examiner—Quang N. Nguyen
(74) Attorney, Agent, or Firm—Davidson Berquist Jackson & Gowdey LLP (57) ABSTRACT

A method and system for connecting a computer user with an information provider over a digitized speech connection. By determining what information a computer user is viewing, the system determines a telephone number associated with that information. The telephone number can be determined via (1) database lookup, (2) parsing of the information, and (3) a directory service using a portion of the name of the information as the query string. The telephone number can then be used to form a telephone connection with the information provider.

37 Claims, 5 Drawing Sheets

TELECOMMUNICATIONS CONTROL SYSTEM USING DATA INTERCHANGE

CROSS REFERENCE TO RELATED APPLICATIONS

Continuity Statement The present application claims priority to U.S. Provisional application Ser. No. 60/144,869, filed Jul. 20, 1999, the contents of which are incorporated herein by reference.

BACKGROUND OF INVENTION

The present invention is directed to a telecommunications control system allowing a user to talk to a person or company providing information on a computer.

The growth of the World Wide Web (hereinafter "the Web") has increased the amount of information that is available to consumers about products, vacation sites and many other things. However, due to the desire to place information on the Web quickly, often the information is not arranged in a fashion that answers the consumer's questions or satisfies the consumer's needs.

In parallel with the information growth, the Internet is being used for more generalized communication through technologies such as voice-over-IP. Proposals exist for providing telephone services over the Internet. One such proposal is Request for Comments (RFC) 1789 by C. Yang dated April 1995, the contents of which are incorporated herein by reference.

One use of the voice-over-IP technology is the Net2Phone service originally provided by IDT Corporation and now provided by Net2Phone, Inc., the assignee of the present invention. Using the Net2Phone service, customers can use their microphone and sound card to carry on a conversation with a called party. The called party is "dialed" by providing a phone number to a Net2Phone server that actually connects the call through the public switched telephone network (with or without using an intermediate long-haul network).

There remain problems with integrating the voice-over-IP technology with providing information on the Web. One such problem is the lack of uniformity for being able to link information on a Web site to a destination phone number if the consumer or viewer still has questions. Although it has been proposed to add an interface for dialing telephone numbers to information displayed in the Web pages (e.g., using the Click2Talk service provided by the assignee of the present invention), adding the interface to each Web site and perhaps each individual Web page may be resource intensive. Furthermore, when the phone number corresponding to the information changes, further changes may also be necessary on the Web pages.

SUMMARY OF INVENTION

Accordingly, it is an object of the present invention to provide a more uniform method of enabling a user to connect to the person or company that is responsible for electronic information displayed on a computer.

According to one aspect of the present invention, the present invention provides a computer-implemented method and system for determining what information a user is viewing and correlating that information with an information provider such that the information provider can be called.

DETAILED DESCRIPTION

Figure 1:
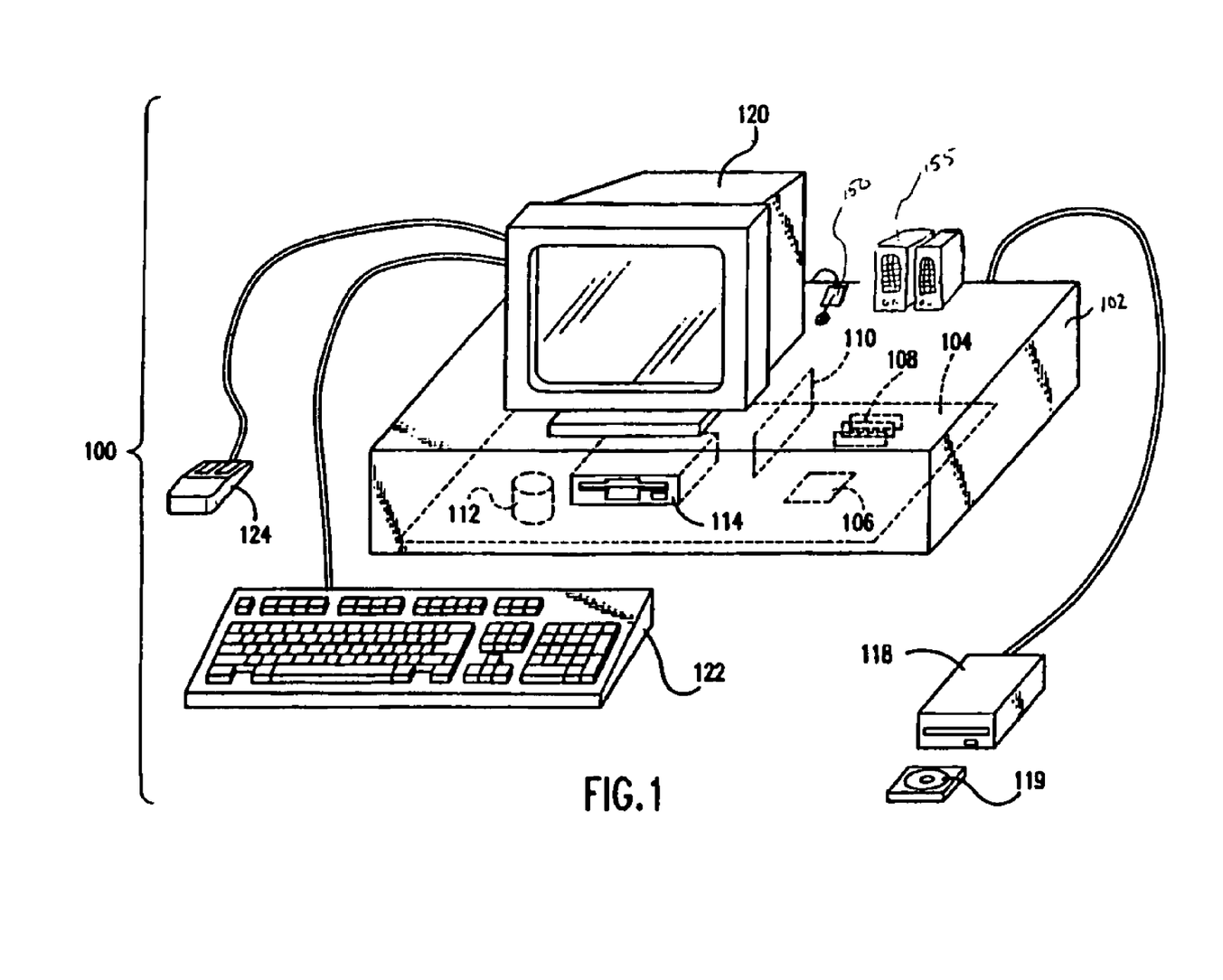
FIG. 1 is a schematic illustration of a computer for implementing one aspect of the invention.

Referring now to the drawings, wherein like reference numerals designate identical or corresponding parts throughout the several views, a brief overview of a structure for providing the services of the present invention is provided with reference to FIG. 1. FIG. 1 is a schematic illustration of a computer system for connecting a computer user with an information provider over a digitized speech connection. Although one embodiment of the digitized speech connection is a Net2Phone connection, other such connections, such as voice-over-IP generally, are possible.

A computer 100 implements the method of the present invention. A computer casing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of how to contact an information provider associated with or responsible for an identified set of electronic information.

For performing voice communications according to the present invention, the computer system 100 also includes a microphone 150 and speakers 155. In the embodiment shown in FIG. 1, the microphone 150 and speakers 155 are provided in separate housings. However, in an alternate embodiment, one or more of the microphone 150 and speakers 155 are included in the monitor 120. The microphone 150 and speakers 155 are generally controlled by a sound card (not shown) that is either plugged into the motherboard 104 or integrated with the motherboard 104.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for connecting a computer user with an information provider over a digitized speech connection. The computer code devices of the present invention can be any interpreted or executable code mechanism, including but not limited to scripts, interpreters, dynamic link libraries, Java classes, and complete executable programs.

Turning now to the operation of the present invention, the program implementing the system of the present invention is started (potentially at system start-up time) and readies itself to receive requests. In the embodiment shown in FIG. 2, the system also has installed its icon 200 in the system tray of the WINDOWS operating system. (In an alternate embodiment, the system is started only when needed and does not remain in the system tray.)

When the user selects the icon 200, the system responds by obtaining the site name of the information that the user is viewing. In the first embodiment, which is the most rudimentary, there is no direct communication between the browser 210 and the system. As such, the system displays an interface for receiving a site name. One such interface is a dialog box, such as the dialog box shown in FIG. 3. After the user enters the site name and selects the "OK" button, the system determines the telephone number, if any, that has been registered as corresponding to the site name, as described more fully below. However, the transfer of the Web site name from the text-input field 220a (shown in FIG. 2) for the URL to the text-input field 220b (shown in FIG. 3) may introduce errors if the user retypes the site's name. Although the user may copy-and-paste the site's name from one field 220a to the other field 220b, that copy-and-paste process requires additional keystrokes.

Figure 2:
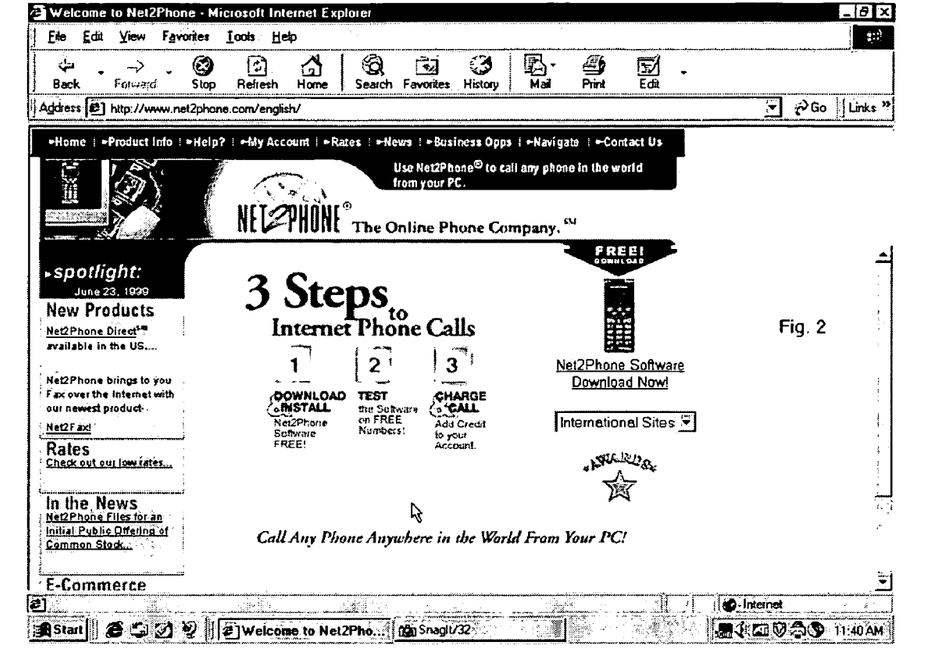
FIG. 2 is a captured image from a screen showing that the system of the present invention waits for requests to connect to a remote telephone.
Figure 3:
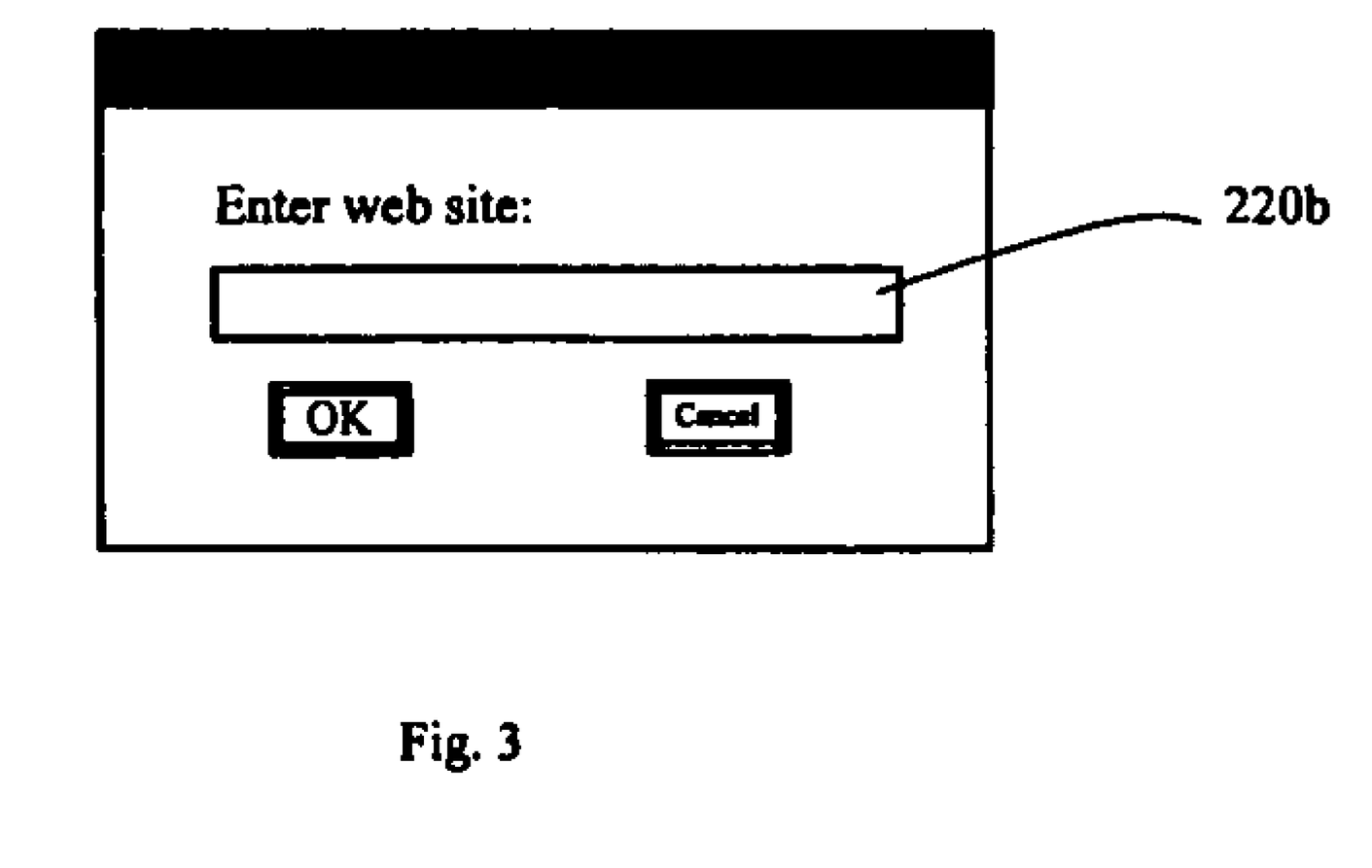
FIG. 3 is an illustration of a first embodiment of the interface for requesting a connection with an information provider.

In yet another alternate embodiment, the browser 210 and the system have the greatest integration. Without requiring that the user highlight the text in the text field 220a, the system nonetheless can obtain the text in the text field 220a. The request is made of the browser 210 when the user clicks on the icon 200 or utilizes a defined hot-key combination. Such a hot-key combination is captured through the use of Windows hooks in the WINDOWS operating system or any other technique that allows the system to receive keystrokes.

Through the use of dynamic data exchange (DDE) messages (or any other inter-process communication mechanism, such as shared memory and named or anonymous pipes), the server can send a request to the browser 210. The request asks that the browser 210 send the text contained in the text field 220a to the program of the system. That text can be sent back using the same or a different inter-process communication method than was used for making the request.

In yet another alternate embodiment, the system is configured to read the last visited Web site from the history file of the browser 210.

Figure 4:
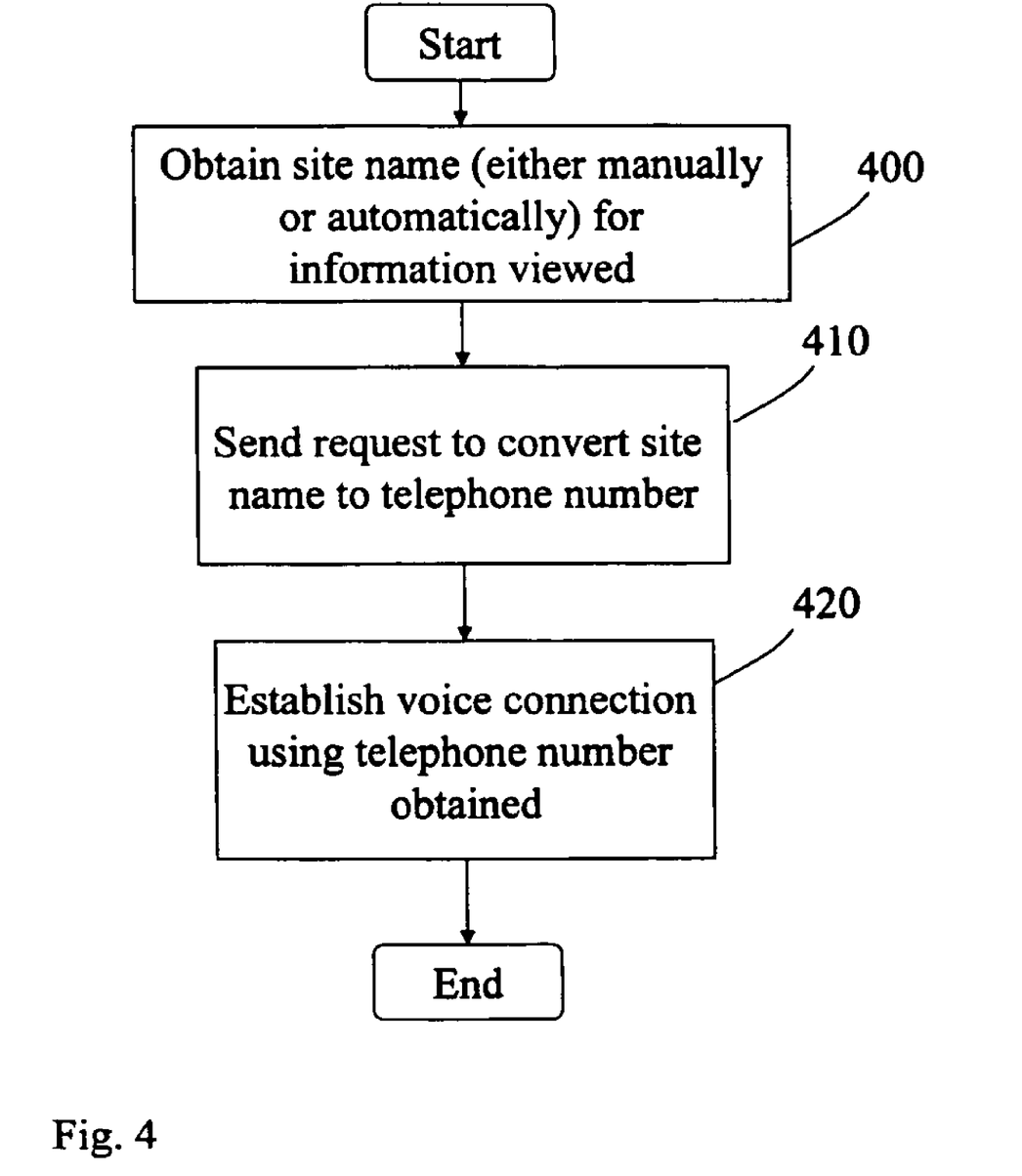
FIG. 4 is a flowchart illustrating the process of requesting a connection with an information provider.

Using any of the above-described techniques, the system of the present invention can obtain the site name of the information being displayed. Thus, the system performs the first step, step 400 shown in FIG. 4, of the method of the invention. As further shown in FIG. 4, the second step of the invention, step 410, includes sending a request to convert the site name to a telephone number. Such a request can either be sent to a local or a remote server.

Using local servers has the drawback of requiring that the local servers maintain consistent data with what the information provider intended. Accordingly, an alternate embodiment utilizes a name-to-number server on a remote machine. The system connects to the name-to-number server (e.g., using TCP/IP sockets) and sends the site's name to the name-to-number server. When the name-to-number server receives the request, the name-to-number server looks up the site's name in a database (e.g., the database shown in FIG. 5). The database correlates the site's name with a voice (or video-voice) destination number.

Figure 5:
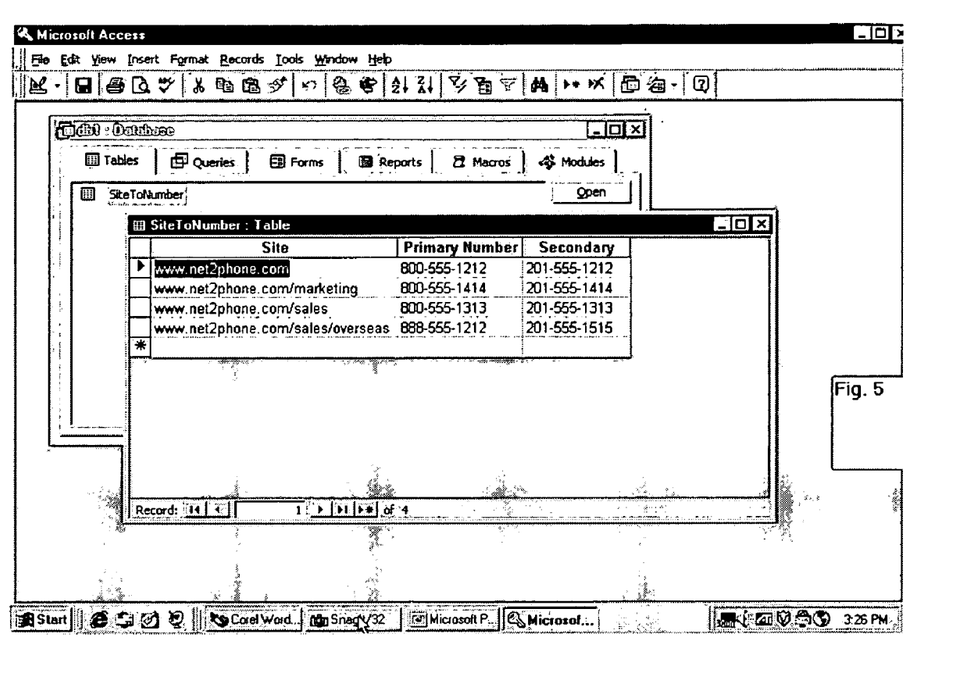
FIG. 5 is a captured image showing one embodiment of how data is stored in order to provide the ability to establish a connection with an information provider.

As shown in FIG. 5, these numbers may be different for different parts of the Web site hierarchy. For example, the main page of the Web site has a different number than those parts associated with the sales and marketing portions of the Web site.

Since often the beginning part of the site's name is repeated, the remote name-to-number server must determine the longest sub-string of the site's name that has a corresponding entry in the database. For example, if the user is viewing a page with an address:

www.net2phone.com/sales/overseas/france.htm it would not be appropriate to stop the matching process upon matching:

www.net2phone.com.

There are several longer strings that still match. Thus, the appropriate final match would be:

www.net2phone.com/sales/overseas having a corresponding phone number of 888-555-1212. According to the invention, it is preferable that the information provider have a toll-free number, but toll-based numbers are also possible. Indeed, the database shown in FIG. 5 includes both a primary number (that is preferably toll-free) and a secondary number that is used if the primary number is not usable (e.g., if a user is outside a toll-free zone).

When the server finds a match, the telephone number is sent back to the system so that the system can establish a voice connection with the information provider. In the preferred embodiment, the connection is established using the Net2Phone service. If the number that is retrieved is a toll-free number, no accounting need be performed by the server connecting the call. On the other hand, if the number is not toll-free, then the server will require authorization to complete the call. Authorizations can include a collect call or calls billed to an account (e.g., a Net2Phone account or a credit card account). In the case of a credit card account, the system establishing the call will have to perform a separate credit card authorization.

It is also possible that the database does not contain a valid entry for the site name specified in the request. In such a case, the reply from the name-to-number server indicates that no number was found. The server can then display an error message to the user indicating that the connection cannot be established. Such an error likewise can be indicated using a voice message or a graphic.

In an alternate embodiment, in order to avoid displaying error messages to the user when a database entry cannot be found, the system performs additional processing to determine the phone number on behalf of the user. In one such embodiment, the system parses the Web page corresponding to the URL that was being viewed to determine if a phone number is embedded within the Web page itself. If no phone information is found within that page, the system can alternately parse the contents of other pages (e.g., the "root"

home page or home page with a fixed name off of the root, such as "/phone.html") in an attempt to find a valid phone number. The system can even "spider" back up the URL tree until it finds a phone number that is assumed to be used for all entries below it. For example, if "www.net2phone.com/sales/overseas/france.htm" does not contain a phone number within it, the system would retrieve and parse the page corresponding to "www.net2phone.com/sales/overseas" to determine if that page contained a valid phone number. If that too failed, then the system would retrieve and parse the page corresponding to "www.net2phone.com/sales." This process is repeated for each level in the URL hierarchy until a valid phone number is found or until no further levels remain.

If a phone number cannot be found by parsing one or more Web pages, the system of the present invention parses the URL name so that a phone number of the company can be determined from one or more directory services. For example, by parsing out "Net2Phone" from a URL, that name can be used in a Yellow Pages query. The result of the query can be parsed to determine a valid phone number.

In addition, other directory services such as "whois" can be used. Since all domain names are registered in a "whois" database (currently maintained by Network Solutions, Inc.), a "whois" query can be used to determine a phone number for the party responsible for the domain name forming the root of the URL. For "net2phone.com", the system can request information on Net2Phone by requesting the corresponding whois Web page at: http://www.networksolutions.com/cgi-bin/whois/whois? STRING=net2phone. The results can be parsed so that a Click2Talk connection can be established. One of ordinary skill in the art will appreciated that other services (e.g., finger or e-mail with auto-reply) can be used to obtain a phone number as well.

However, its is also possible to continuously track what information a user is viewing so that the system can display to the user (before the user makes a request) whether or not the Current URL in the text field 220*a* is registered. In this embodiment, the system and the browser 210 exchange information as each new Web page is viewed. After exchanging information, the icon 200 flashes and/or changes color when a user visits a Web site that is listed in the database. Thus, when the icon 200 is flashing, the user knows that a call can be initiated quickly.

Although the above description has been given in terms of the system specifying a telephone number to be dialed by a remote server, in an alternate embodiment, the present invention determines the number to be dialed and then uses the user's telephone to actually complete the call. When the user is connected to the Web using the telephone, the system requests permission to hang-up the phone in order to establish the telephone connection. When the user is connected to the Web without using the telephone (e.g., using a cable-modem or wireless connection), the system need only check that the telephone is not already in use (e.g., by checking for a dial tone). Using this alternate embodiment, the user is not restricted to being close to the computer while talking with the information provider. Instead, the user is free to switch to a cordless phone and move about. Similarly, using this alternate embodiment, the user has the benefit of the quality of a true telephone connection.

In yet another alternate embodiment, the user also does not dial a telephone number but rather connects to a voice server over an IP-based connection. The voice server routes incoming connection requests to available agents without requiring that a telephone line be used on the information provider's side. For example, an information provider may have a T3 connection to the Internet and many conversations are carried over the T3 line simultaneously. By using a voice server, a company may eventually be able to reduce its costs associated with its toll free (e.g., 800/888/877) telephone number (s).

In yet another alternate embodiment, the system sends a message to a telephone switch at the information provider such that the information provider (1) calls back the user at the telephone number associated with the user and (2) calls an agent at the information provider. This is beneficial for companies that do not have toll-free service or for users that cannot access toll-free (such as international customers). One such service is Click2CallMeBack and enables the call to be set up either immediately or at a later time specified by the user. In order to ensure that the user is prepared to receive the call when scheduled, the user is first connected to an automated recording asking if the user is ready. If the user is not ready, the call can be canceled. If the call is accepted, the system connects to an agent and then bridges the existing call with the call to the agent.

Although the above has been described in terms of a communication between the system and a browser 210, in an alternate embodiment, the system communicates with a target program that is not a browser 210. In that alternate embodiment, the target program and the system communicate, preferably through DDE messages. In one such embodiment, the system communicates with Adobe Acrobat or Microsoft Word to retrieve a document or company identifier that corresponds to the document being viewed. For example, after having downloaded a tax form from the IRS web site, a tax-payer may have questions about how to fill-out the form. The tax-payer, therefore, can call the IRS's hotline.

If the document or company identifier is a site's name, then processing can proceed as described above. If instead the identifier is the number to be called directly, then a voice connection can be established without interacting with a remote name-to-number server.

Obviously, numerous modifications and variations of the present invention are possible in light of the above teachings without departing from the spirit of the present invention.

The invention claimed is:

1. A computer program product, comprising:
   a computer storage medium and a computer program code mechanism embedded in the computer storage medium,
   the computer program code mechanism comprising:
   a first computer code device configured to obtain a Uniform Resource Locator stored in an address bar of a Web browser corresponding to a Web page being displayed to a user by the Web browser of a user-side;
   a second computer code device configured to convert, without user intervention, the Uniform Resource Locator into a telephone number corresponding to a location at which a provider of the Web page can be contacted; and
   a third computer code device configured to visually identify, without user intervention, that the telephone number is known for the Uniform Resource Locator corresponding to the Web page being displayed to the user.

2. The computer program product according to claim 1, further comprising a fourth computer code device configured to control a telephone switch to dial the telephone number.

3. The computer program product according to claim 1, further comprising a fourth computer code device configured to establish a voice-over-IP voice communication connection between the user-side and a Web page provider-side.

4. The computer program product as claimed in claim 1, wherein the first computer code is further configured to obtain a current Uniform Resource Locator as each new Web page is viewed.

5. The computer program product as claimed in claim 1, wherein the third computer code device is further configured to visually identify by causing an icon to flash.

6. The computer program product as claimed in claim 1, wherein the third computer code device is further configured to visually identify by causing an icon to change color.

7. The computer program product according to claim 1, wherein the second computer code device is configured to obtain the telephone number from a local database.

8. The computer program product according to claim 1, wherein the second computer code device is configured to obtain the telephone number from a remote database.

9. The computer program product according to claim 1, further comprising a fourth computer code device configured to establish a voice communications channel between the user side and a Web page provider-side using the telephone number.

10. The computer program product according to claim 1, wherein the second computer code device is configured to obtain, from a database, a longest matching sub-string of the Uniform Resource Locator without requiring a complete match of the Uniform Resource Locator to be found in the database.

11. The computer program product according to claim 10, wherein the longest matching sub-string comprises a longest matching prefix.

12. A computer-implemented method comprising:
obtaining a Uniform Resource Locator stored in an address bar of a Web browser corresponding to a Web page being displayed to a user by the Web browser at a user-side;
converting the Uniform Resource Locator, without user intervention, into a telephone number corresponding to a location at which a provider of the Web page can be contacted; and
visually identifying, without user intervention, that the telephone number is known for the Uniform Resource Locator corresponding to the Web page being displayed to the user.

13. The method as claimed in claim 12, further comprising controlling a telephone switch to dial the telephone number.

14. The computer-implemented method according to claim 12, further comprising establishing a voice-over-IP voice communication connection between the user-side and a Web page provider-side.

15. The computer-implemented method according to claim 12, further comprising establishing a voice-over-IP voice communication connection across a Wide Area Network between the user-side and a Web page provider-side.

16. The computer-implemented method according to claim 12, further comprising establishing a voice-over-IP voice communication connection across the Internet between the user-side and a Web page provider-side.

17. The computer-implemented method as claimed in claim 12, wherein the step of obtaining comprises obtaining a current Uniform Resource Locator as each new Web page is viewed.

18. The computer-implemented method as claimed in claim 12, wherein the step of visually identifying comprises causing an icon to flash.

19. The computer-implemented method as claimed in claim 12, wherein the step of visually identifying comprises causing an icon to change color.

20. The computer-implemented method according to claim 12, wherein the step of converting comprises obtaining the telephone number from a local database.

21. The computer-implemented method according to claim 12, wherein the step of converting comprises obtaining the telephone number from a remote database.

22. The computer-implemented method according to claim 12, further comprising establishing a voice communications channel between a user-side and a Web page provider-side using the telephone number.

23. The computer-implemented method according to claim 12, wherein the step of converting comprises obtaining, from a database, a longest matching sub-string of the Uniform Resource Locator without requiring a complete match of the Uniform Resource Locator to be found in the database.

24. The computer-implemented method according to claim 23, wherein the longest matching sub-string comprises a longest matching prefix.

25. A telecommunications system comprising:
a receiver configured to obtain a Uniform Resource Locator stored in an address bar of a Web browser corresponding to a Web page being displayed to a user by the Web browser of a user-side;
a converter configured to convert, without user intervention, the Uniform Resource Locator into a telephone number corresponding to a location at which a provider of the Web page can be contacted;
a controller configured to visually identify, without user intervention, that the telephone number is known for the Uniform Resource Locator corresponding to the Web page being displayed to the user.

26. The telecommunications system according to claim 25, wherein the controller comprises a telephone switch controller to dial the telephone number.

27. The telecommunications system as claimed in claim 25, wherein the receiver is further configured to obtain a current Uniform Resource Locator as each new Web page is viewed.

28. The telecommunications system as claimed in claim 25, wherein the controller is further configured to visually identify by causing an icon to flash.

29. The telecommunications system as claimed in claim 25, wherein the controller is further configured to visually identify by causing an icon to change color.

30. The system according to claim 25, wherein the converter is configured to obtain the telephone number from a local database.

31. The system according to claim 25, wherein the converter is configured to obtain the telephone number from a remote database.

32. The system according to claim 25, wherein the controller further establishes a voice communications channel between a user-side and a Web page provider-side using the telephone number.

33. The system according to claim 25, wherein the converter is configured to obtain, from a database, a longest matching sub-string of the Uniform Resource Locator without requiring a complete match of the Uniform Resource Locator to be found in the database.

34. The system according to claim 33, wherein the longest matching sub-string comprises a longest matching prefix.

35. A computer program product, comprising:

a computer storage medium and a computer program code mechanism embedded in the computer storage medium, the computer program code mechanism comprising:

a first computer code device configured to obtain a Uniform Resource Locator identifying a Web page currently being displayed to a user by a Web browser of a user-side;

a second computer code device configured to convert, without user intervention, the Uniform Resource Locator into a contact telephone number corresponding to the Web page;

a third computer code device configured to visually identify, without user invention, that the contact telephone number is known for the Uniform Resource Locator corresponding to the Web page being displayed to the user.

36. A computer-implemented method comprising:

obtaining a Uniform Resource Locator identifying a Web page currently being displayed to a user by a Web browser at a user-side;

converting the Uniform Resource Locator, without user intervention, into a contact telephone number corresponding to the Web page; and visually identifying, without user intervention, that the contact telephone number is known for the Uniform Resource Locator corresponding to the Web page being displayed to the user.

37. A telecommunications system comprising:

a receiver configured to obtain a Uniform Resource Locator identifying a Web page currently being displayed to a user by a Web browser of a user-side;

a converter configured to convert, without user intervention, the Uniform Resource Locator into a contact telephone number corresponding to the Web page;

a controller configured to visually identify, without user intervention, that the contact telephone number is known for the Uniform Resource Locator corresponding to the Web page being displayed to the user.

* * * * *